(12) United States Patent
Pedersen et al.

(10) Patent No.: US 9,342,907 B1
(45) Date of Patent: May 17, 2016

(54) METHOD AND SYSTEM FOR ANALYZING BALLISTIC TRAJECTORIES

(71) Applicant: Lockheed Martin Corporation, Bethesda, MD (US)

(72) Inventors: Richard N. Pedersen, Toms River, NJ (US); Paul D. Mountcastle, Moorestown, NJ (US); Stanley Jordan Viss, Philadelphia, PA (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 636 days.

(21) Appl. No.: 13/787,287

(22) Filed: Mar. 6, 2013

(51) Int. Cl.
  *G06G 7/48* (2006.01)
  *G06T 11/20* (2006.01)
  *F42B 10/02* (2006.01)
  *F41G 3/26* (2006.01)
  *F42B 15/10* (2006.01)

(52) U.S. Cl.
  CPC ............ *G06T 11/206* (2013.01); *F41G 3/2622* (2013.01); *F42B 10/025* (2013.01); *F42B 15/10* (2013.01)

(58) Field of Classification Search
  CPC ........... F41G 3/26; F41G 7/00; F41G 3/2622; G05D 1/00; B60L 15/00; G01C 22/00; F42B 19/00; F42B 10/025; F42B 15/10; G01S 13/00; G06F 17/30
  See application file for complete search history.

(56) References Cited

U.S. PATENT DOCUMENTS

| | | | | |
|---|---|---|---|---|
| 5,798,942 A | * | 8/1998 | Danchick et al. | 342/96 |
| 6,125,308 A | * | 9/2000 | Hills et al. | 701/1 |
| 6,259,974 B1 | * | 7/2001 | Bessacini et al. | 701/1 |
| 2008/0262999 A1 | * | 10/2008 | Helsen et al. | 707/2 |
| 2009/0035730 A1 | * | 2/2009 | Lindero | 434/22 |
| 2010/0180344 A1 | | 7/2010 | Malyshev et al. | |
| 2011/0173189 A1 | * | 7/2011 | Singh et al. | 707/722 |

OTHER PUBLICATIONS

Vinti, J.P. "Improvement of the Spheroidal Method for Artificial Satellites", The Astronomical Journal, vol. 74, No. 1, pp. 25-34, (Feb. 1969).

Landau, L.D. and Lifschitz, E.M. "Mechanics, 3rd Edition", Pergamon Press, pp. 35-39, Oxford (1976).

* cited by examiner

*Primary Examiner* — Kandasamy Thangavelu
(74) *Attorney, Agent, or Firm* — Howard IP Law Group, PC (57) ABSTRACT

A method for analyzing ballistic trajectories comprises determining invariants for known ballistic objects, defining a reference graph having nodes corresponding to the invariants, and defining a query graph having nodes connected to nodes of the reference graph corresponding to anticipated invariant queries to be made using the query graph. One or more sets of invariants corresponding to trajectories of one or more observed objects are input into the reference graph and traverse through the nodes of the reference graph, leaving a record in the nodes traversed. A query is selected for the query graph corresponding to one or more range of invariants, the query generating a query result identifying the nodes of the reference graph that satisfy the query. Identifying each of the observed objects identified by a record in the identified nodes determines which of the one the observed objects satisfy the query.

20 Claims, 7 Drawing Sheets

METHOD AND SYSTEM FOR ANALYZING BALLISTIC TRAJECTORIES

FIELD OF THE INVENTION

The present invention relates to ballistic trajectory analysis and more particularly to a method and system for comparing ballistic trajectories.

BACKGROUND OF THE INVENTION

A ballistic trajectory represents the motion of an object where the only substantive force acting on the object is the earth's gravity. An object is typically placed in such a trajectory through the use of one or more booster rockets that throw the object away from the earth and its atmosphere and into a desired trajectory intended to cause the object to reach a given destination. The booster rocket(s) provide the initial force acting on the object, but once they burn out the object is only acted upon by gravity and it assumes its ballistic trajectory. Such a trajectory is elliptical in shape, occurring fully within a geometric plane that passes through the earth's center. If the ellipse is of sufficient size, the object will continue to orbit the earth in that trajectory indefinitely. If, as is the case with offensive ballistic missiles, the orbit is not sufficiently large for the object to freely orbit the earth, it will collide with the earth at some point in the orbit, but it may do so at a great distance from where it is launched, and it will collide with the earth at enormous speed.

It is believed that Johannes Kepler made the first accurate descriptions of such trajectories in the seventeenth century, the physics of which were then explained later in that century by Isaac Newton. From their work, it is possible to identify six invariants of ballistic trajectories that may be used to uniquely characterize a given trajectory, with these invariants being constant as long as the object orbits the earth. Using such a characterization, it is possible to analyze these trajectories in meaningful ways, such as determining whether different observers far removed from one another are observing the same object.

When tracking objects exhibiting ballistic motion, it is frequently of interest to compare one object's motion to that of another object, or to compare one or more such trajectories to a set of criteria used to identify objects meeting the criteria. The analysis of trajectories is, in general, complicated by their dynamic nature. The comparison of one ballistic trajectory to another, or the comparison of multiple objects to a set of criteria, is problematic since the motion of the objects is non-linear. These non-linearities include variations in speed and course. While it is possible to use the invariants to calculate these parameters for any given position or time, which calculations are used to good effect for much important analysis of such trajectories, the process is cumbersome. For example, for many analyses of potential interest, many such calculations must be performed iteratively to achieve the desired result, particularly when the analysis consists of analyzing many ballistic objects simultaneously. The use of the invariants simplifies the comparison analysis essentially by transforming the analysis in a way that changes it from a dynamic to a static analysis.

In addition, because of the dynamic nature of the trajectories, it is common practice to individually estimate each object's position at some given time, and then compare their estimated positions to determine whether they satisfy the criteria. However, individually estimating and comparing trajectories is inefficient. For example, under the common practice, the work of comparing a given object to all other objects is proportional to the number of objects being observed. If a comparison is required of all objects to all other objects, the comparison effort grows exponentially with the number of objects.

Alternative systems and methods for rapid and accurate determination and analysis of ballistic trajectories are desired.

SUMMARY OF THE INVENTION

A method for analyzing ballistic trajectories is disclosed that allows for rapid analysis of objects with ballistic trajectories using the invariants of their orbits. The method uses a reference graph and a query graph, which allow for rapid comparison of vehicular objects whose ballistic trajectory invariants are used to instantiate references to the objects into the reference graph. The reference graph may be developed using invariants for known ballistic trajectories from multiple sensor types and the query graph may be developed to provide connections to the reference graph for anticipated queries. Among other possible uses, embodiments of the invention may rapidly and accurately identify and characterize objects with a ballistic trajectory, such as missiles carrying weapons of mass destruction. With this identification and characterization information, an engagement may be rapidly commenced for the purpose of destroying such a weapon before it causes significant harm.

A method for analyzing ballistic trajectories may comprise: determining invariants for known ballistic object trajectories; defining a reference graph having nodes and links corresponding to the invariants for the known ballistic object trajectories; defining a query graph having nodes connected to the nodes of the reference graph corresponding to anticipated queries to be made using the query graph; inputting into the reference graph a first set of invariants corresponding to a first observed object and traversing through the nodes of the reference graph based on the first set of invariants; inputting into the reference graph one or more additional sets of invariants corresponding to one or more additional observed objects and, for each of the one or more additional observed objects, traversing through the nodes of the reference graph based on the one or more additional sets of invariants; selecting a query for the query graph corresponding to the first set of invariants, the query generating a query result identifying the nodes of the reference graph that satisfy the query; and determining that an object corresponding to one of the one or more additional sets of invariants is the same as the first observed object if the object's invariants caused traversal through the identified nodes.

The invariants for the known ballistic object trajectories, the first set of invariants, and the one or more sets of additional invariants may be determined from state vectors. The query corresponding to the first set of invariants may comprise the first set of invariants and a padding range for each of the first set of invariants. Traversing through the nodes of the reference graph based on the first set of invariants may further comprise storing for each traversed node a record of the first observed object corresponding to the first set of invariants. Traversing through the nodes of the reference graph for each of the one or more additional observed objects further may comprise storing, for each of the one or more additional observed objects, in the each traversed node a record of the object whose invariants caused traversal of the traversed node. Determining if the invariants corresponding to the object passed through the identified nodes comprises determining if a record of the object was stored in the identified nodes.

The method may further comprise removing the record of the first observed object from the reference graph when observation of the first observed object is discontinued. The method may also further comprise removing the record of each of the one or more observed additional objects from the reference graph when observation of each of the one or more observed additional objects is discontinued. Selecting the query for the query graph may further comprise making available queries for selection corresponding to connections between the nodes of the query graph and the nodes of the reference graph.

A method for analyzing ballistic trajectories may comprise: determining invariants for known ballistic objects; defining a reference graph having nodes corresponding to the invariants for the known ballistic objects; defining a query graph having nodes connected to nodes of the reference graph corresponding to anticipated invariant queries to be made using the query graph; inputting into the reference graph one or more sets of invariants corresponding to trajectories of one or more observed objects, each of the one or more sets of invariants traversing through the nodes of the reference graph corresponding to the each of the one or more sets of invariants and leaving a record in the nodes traversed; selecting a query for the query graph corresponding to one or more range of invariants, the query generating a query result identifying the nodes of the reference graph that satisfy the query; and identifying each of the one or more observed objects identified by a record in the identified nodes, thereby determining which of the one or more observed objects satisfy the query.

The invariants for the known ballistic objects and each of the one or more sets of invariants may be determined from state vectors for the known ballistic objects. The range of invariants defined in the defining of the query graph may comprise the range of invariants defining a particular search volume. At least some of the anticipated invariant queries are the range of invariants defining the particular search volume. In an embodiment, the range of invariants defined in the defining of the query graph may comprise a range defining a particular timespan and wherein at least some of the anticipated invariant queries are a range of invariants defining the particular timespan. In another embodiment, the range of invariants defined in the defining of the query graph may comprise a combination of a range defining a particular search volume and a range defining a particular timespan and wherein at least some of the anticipated invariant queries are combinations of the particular search volume and the particular timespan.

Connections between nodes of the reference graph and nodes of the query graph may comprise the connections between nodes of the query graph corresponding to anticipated invariant queries and nodes of the reference graph that correspond to anticipated invariant queries. Selecting the query for the query graph may further comprise making available queries for selection corresponding to connections between the nodes of the query graph and the nodes of the reference graph.

A system for analyzing ballistic trajectories may comprise: a database for storing trajectory data for known ballistic objects; a preprocessor configured to determine invariants for each of the known ballistic objects based on the trajectory data in the database, defining a reference graph having nodes corresponding to the invariants for each of the known ballistic objects, and defining a query graph having nodes connected to the nodes of the reference graph corresponding to anticipated queries to be made using the query graph; at least one sensor configured to monitor trajectories of one or more observed objects; a runtime processor configured to provide to the reference graph one or more sets of invariants corresponding to the trajectories of the one or more observed objects monitored by the at least one sensor, each of the one or more sets of invariants traversing through the nodes of the reference graph corresponding to the each of the one or more sets of invariants and leaving a record in the nodes traversed; and an interface for selecting a query for the query graph corresponding to one or more range of invariants, the query generating a query result identifying the nodes of the reference graph that satisfy the query. The runtime processor may identify records left in the identified nodes (e.g., determine or identify those records that correspond to, or are associated with, the identified nodes), thereby determining an identity of the one or more observed objects that satisfy the query.

The system may further comprise a display for displaying the identity of the one or more observed objects that satisfy the query. The anticipated queries used by the preprocessor to define the query graph may be a range of invariants defining a particular search volume. In an embodiment, the anticipated queries used by the preprocessor to define the query graph may be a range of invariants defining a particular timespan. In another embodiment, the anticipated queries used by the preprocessor to define the query graph may be combinations of a range of invariants defining a particular search volume and a range of invariants defining a particular timespan. The anticipated queries used by the preprocessor to define the query graph may also be a range of invariants defining a known ballistic trajectory.

DETAILED DESCRIPTION

Before embarking on a detailed discussion the following should be understood. The functions and blocks provided in FIGS. 1-10 may be implemented using hardware (such as computers, memory, processors, and the like), software, firmware, and may reside on one or more computer systems located at one or more locations. In an embodiment in which different parts of the system (e.g., the part of the system for creating the graph and the part of the system for processing real-time sensor data) are remotely located from each other, a computer network, or other network capable of transmitting data and information (or even graphs or programming) between the different parts of the system, may be used to connect the different parts. The observed ballistic trajectory data used in the processing and preprocessing described may be obtained from a variety of different types of sensors including, but not limited to land-based, air-based, or space-based sensors, infrared, and electro-optical sensors, or any type of sensor capable of providing data in relation to the observation of ballistic objects.

The systems and processes of FIGS. 1-10 are not exclusive. Other systems and processes may be derived in accordance with the principles of the invention to accomplish the same objectives. Although this invention is described with reference to particular embodiments, it is to be understood that the embodiments and variations shown and described herein are for illustration purposes only. Modifications to the current design may be implemented by those skilled in the art, without departing from the scope of the invention.

Figure 1:
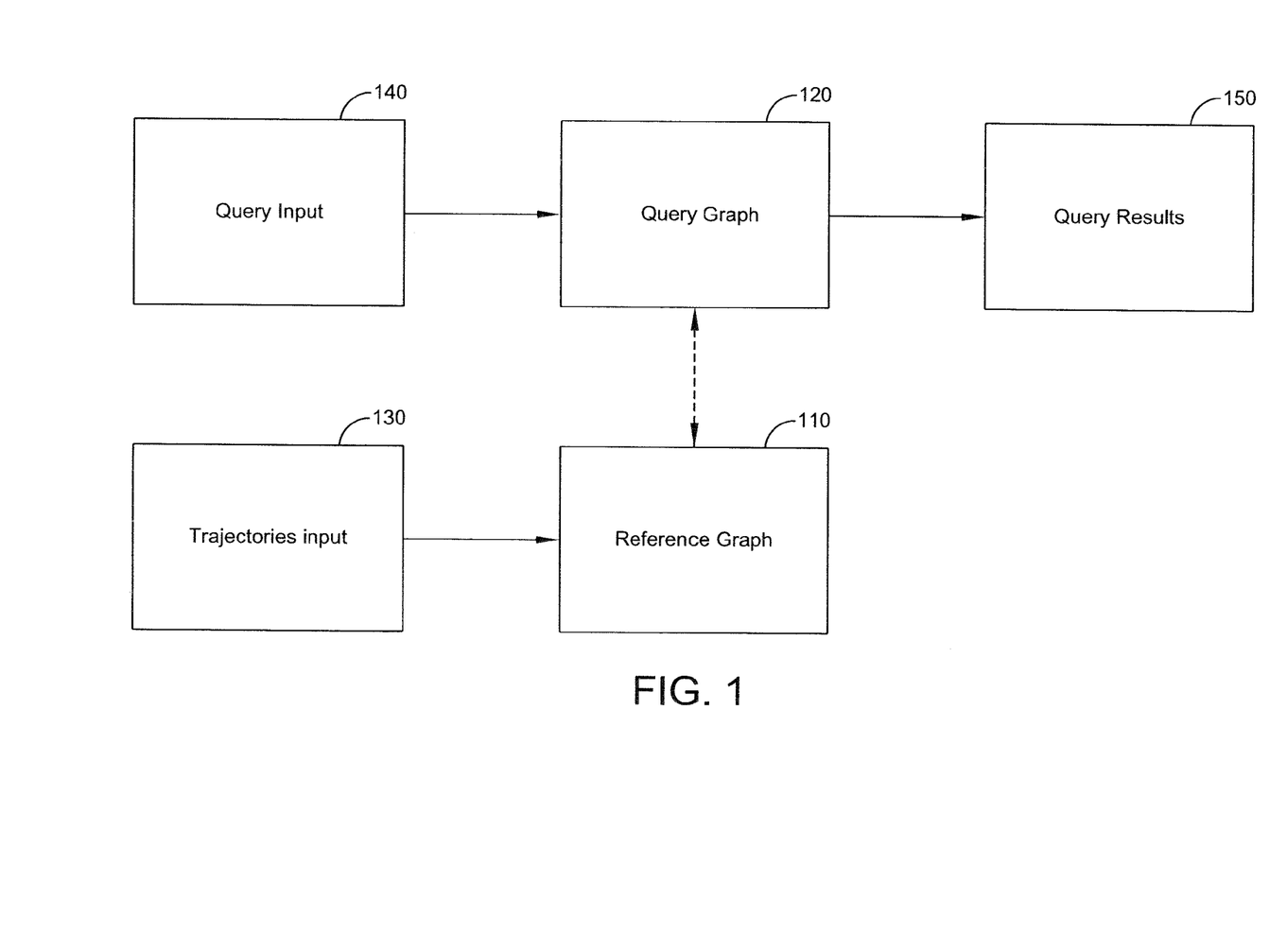
FIG. 1 depicts a simplified block diagram of an embodiment of a system for ballistic trajectory analysis.

FIG. 1 depicts an overview of an embodiment of a system for analyzing ballistic trajectories. Block 110 depicts a reference graph onto which is mapped a target (e.g. expected) range of invariants. The reference graph provides a framework for representing a ballistic object's multi-dimensional invariant values. The reference graph uses a tree structure to map expected invariants for different ballistic trajectories that might be expected to be observed by a sensor, the tree structure effectively providing a decomposition of the possible trajectories of ballistic objects in terms of their invariants. Thus, the reference graph is essentially a discrete representation of the space in which ballistic objects may be observed in terms of the invariants of known ballistic trajectories (i.e., invariant space), with the number of levels in the tree and the number of branches at each level being dependent on the granularity targeted for a given application. In an embodiment, the reference graph may be created by obtaining an electronic database of known ballistic trajectories, calculating invariants for the known ballistic trajectories using a preprocessor, and then defining the reference graph using the preprocessor. In another embodiment, the database of known ballistic trajectories may be non-electronic, and hand calculation may be used to determine the invariants for the known trajectories.

Block 120 is a query graph interconnected with the reference graph that provides the necessary paths to support the analyses to be performed on ballistic trajectories. The query graph is "woven" into the reference graph to allow rapid identification of objects satisfying selected criteria used for a query. In an embodiment, the query graph may be defined, using a preprocessor, by identifying expected queries and creating interconnections between the reference graph and query graph that correspond to each expected query. The type of criteria that may be used in a query (the query criteria) must be identified prior to preprocessing so that the appropriate interconnections to the reference graph may be installed. For example, one type of criteria is volume, and a specific query may relate to a specific volume. In another example, another criteria may be time, and a specific query may be directed to a particular time frame. The query criteria will also be discrete, meaning that it will use criteria with predetermined ranges of invariant values. For example, one set of criteria might be to select all objects in the reference graph that will be contained in a given volume during a given span of time. In this case, the query graph connections would be made to the level or levels of the reference graph corresponding to the size of the volumes and range of the time spans. Then for each of the anticipated combinations of volumes and time spans, the nodes or locations in the reference graph corresponding to all of these combinations will be computed, and an interconnection will be made from the query graph to the corresponding place in the reference graph. The structure of the query graph will, like the reference graph, be tree-like with decomposition of the invariant space covered by the query criteria at each level of the query tree, so as to minimize the time needed to identify those locations in the reference graph corresponding to the combination of the query criteria. As will be understood, a given set of query criteria may correspond to multiple locations in the reference graph, which situation may be accommodated by using multiple paths from the query graph to the reference graph for such query criteria combinations. At runtime, as a query is presented to the query graph, a runtime processor will traverse the query graph to identify the locations (nodes) in the reference graph that correspond to the query criteria. Note that the nodes traversed in the reference graph may be empty (or may have no record of a traversal by invariants for an object), which would indicate that there are no objects presently satisfying the query criteria.

Figure 8:
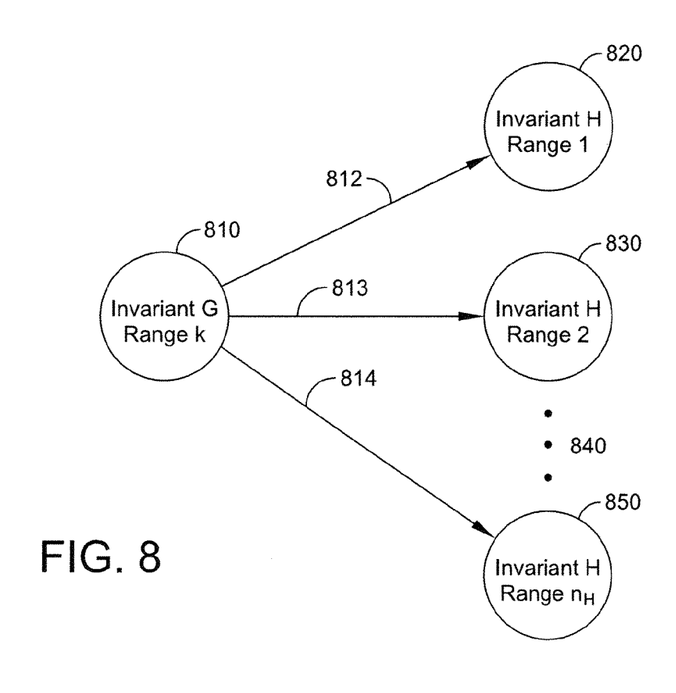
FIG. 8 depicts an exemplary intermediate portion of a graph.

Block 130 represents the ballistic trajectory invariants of the ballistic objects that are being observed, whose invariants are used to input references to particular objects into the reference graph during runtime operation using a runtime processor. As ballistic objects are observed, invariants for the trajectories of the ballistic objects may be calculated by a runtime processor and used by the processor to traverse the reference graph, based on the values of these invariants and the range of invariants of particular nodes in the graph. The reference graph is traversed to locate the appropriate places in the graph to record the object based on its trajectory invariants. In an example, let us assume that the values of Invariants A through G of an observed ballistic object caused a traversal of the reference graph in a manner such that node 810 was reached as shown in FIG. 8. Assuming further that Invariant H for this object had a value that fell within Range 2, this would cause a traversal to node 830 of FIG. 8. As the graph is traversed, a record of the object (e.g., a data field associated with the node for recording objects that have traversed the node) will also be made at or for each visited node. As will be understood, reference to records being made or left "in" or "at" a node may also refer to a data record that is made that corresponds to, or is associated with, a node. When the object is "dropped" from observation (i.e., observation of the object by sensors is discontinued), the runtime processor will be notified, and it will use that notification to initiate the removal of the object from the reference graph by traversing the graph and deleting the object's references. The object's invariants should not change significantly during the time it is under observation, but the invariants should be recalculated periodically to ensure that its representation in the graph is still valid. In an embodiment, the runtime processor may be configured to update the reference graph to reflect a new set of invariants if a predetermined (e.g., a user-defined) amount or degree of change is detected in the invariants. Either intermediate or terminal levels in the reference graph may be of interest in a particular embodiment of the invention. In either type of embodiment, a mapping is created between the graph nodes at the level of interest (which may include the lowest level as well as higher levels) and the query graph. The nodes of the graph may be referred to as leaves. In particular, nodes at the terminal, or lowest relevant level, of the graph may be referred to as leaves.

Block 140 represents a query that may be input into the query graph 120. Queries may encompass different parameters and may be input using an interface to the runtime processor. As will be understood, the interface may comprise a user interface such as a keyboard, mouse, and display screen that allows a user to enter a query or select a query from a selection of queries. In an embodiment, a query may be used to compare a trajectory currently being observed for an object with a trajectory or trajectories that were previously observed, perhaps by a different sensor, to determine if the objects observed by the different sensors are actually the same object. In an embodiment, the trajectory for the object being observed as well as the trajectories for previously observed objects are input into the reference graph 110. Then an input query 140 may be entered or input, using the interface, into the query graph 120, and during the runtime processing the runtime processor will identify any objects that have invariants that satisfy the query. For example, if an input query is input that uses the invariants of the object currently being observed as the query, runtime processing will identify the object currently being observed, as well as any other objects that have the same invariants, as objects that have invariants that satisfy the query. If the previously observed objects are identified as a result of the query, then they may be the same object as the currently observed object.

In an embodiment, an input query may include a "padding" range for each invariant used for the query, to account for the expected effect of object measurement error. That is, when sensors observe features of an object such as its location, speed, or size, there may some error inherent in that observation. That error carries over when the invariants for the object (which are based on the features observed) are calculated. In order to account for this error, the input queries may, in an embodiment, include "padding" to account for this error. This padding may comprise using a user-defined "range" for an invariant for a query, rather than using an exact value for the invariant for the query. In this way, runtime processing may identify objects that have invariants that are sufficiently close to but do not exactly match the invariants of the query, perhaps due to object error measurement.

In other embodiments, queries could be used to identify objects that satisfy particular criteria other than having invariants similar to an observed object. For example, an input query may be formulated that specifies a particular volume of space and the query result 150 identifies objects within that volume. In another example, an input query may be formulated that specifies a particular timespan and the query result 150 identifies objects that were observed during that timespan. As will be understood, multiple criteria may be combined in a query. For example, a query may be formulated that specifies a particular volume and a specific timespan and the query result 150 will identify the objects that are within the volume during the selected timespan. In this example, which could be used to develop a targeting solution, the selection criteria for the input query will include a range of the various invariants specifying both the search volume and the search timespan.

To calculate invariants for the previous or observed trajectories the system and method may use a simplified Earth model where the Earth is considered spherical and has a uniform gravitational field, or a more precise Earth model such as described in J. P. Vinti, "Improvement of the Spheroidal Method for Artificial Satellites," The Astronomical Journal, Vol. 74 Num. 1 pp. 25-34 (February 1969). In the simplified model, an object's ballistic trajectory may be defined using the following invariants: its specific energy, E; its orbital angular momentum, L; the transformation matrix M of three vectors $x_0$, $y_0$, and $z_0$ used to align the plane containing the trajectory with an Earth reference; and the time $t_p$ at which the ballistic object will pass through its perigee.

Figure 10:
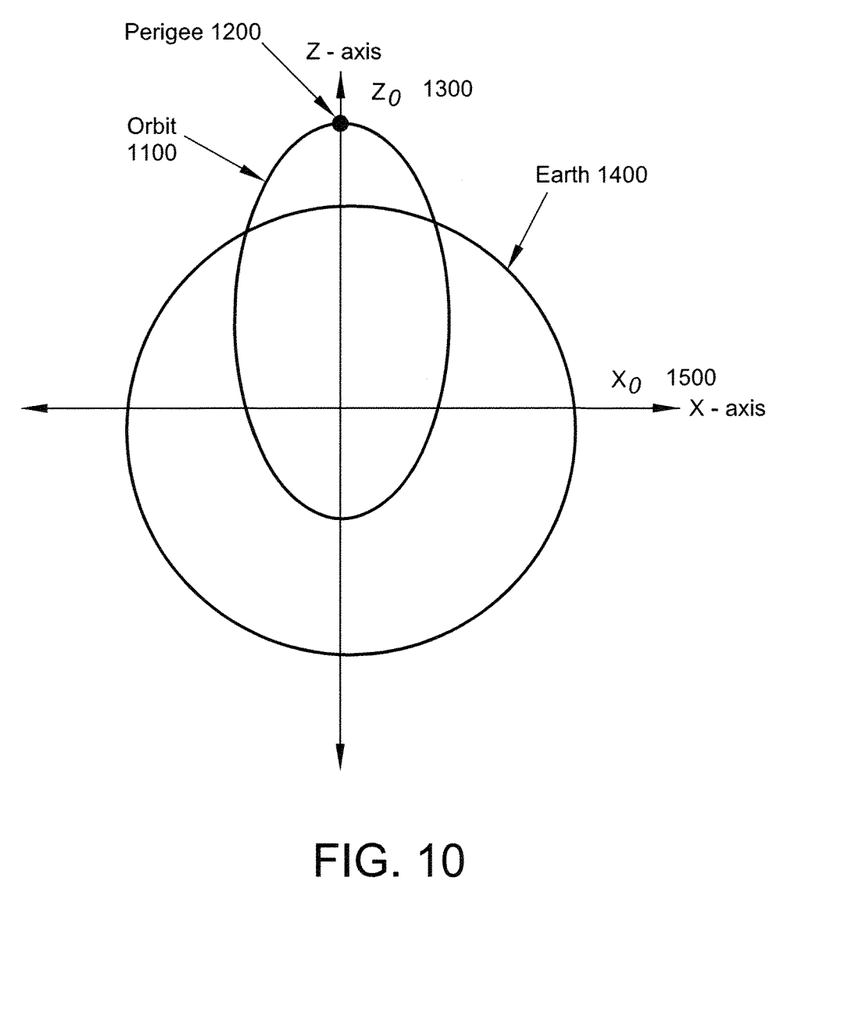
FIG. 10 depicts an exemplary orbit-fixed frame of reference that lies in the orbital plane (x, z) with its z-axis pointing in the direction of apogee.

The object's state vector is represented by (r, v) and the object's polar coordinates (r, θ) are measured in the fixed plane of the orbit. The simplified model thus comprises six invariants that represent a ballistic trajectory. FIG. 10 shows the earth 1400 along with an x-axis 1500 and a z-axis 1300 that meet at the center of the earth. Also shown is a ballistic trajectory, or orbit 1100 with perigee 1200.

The motion of a small satellite in the presence of a gravitational field with spherical symmetry may be found by using the standard methods of analytical mechanics, proceeding from the Lagrangian of the mechanical system via the principle of least action. The Lagrangian ($\mathcal{L}$) of the system may be written in spherical polar coordinates as $$\mathcal{L} = T - V = \frac{1}{2}mv^2 + \frac{GM \cdot m}{r} \tag{1}$$

where T is kinetic energy; V is potential energy; m is mass; v is velocity; $GM=3.98658366*10^{14}$ m³/s² denotes the product of the mass of the Earth and the universal gravity constant; and r denotes the range. The equations of motion then follow from the principle that the action integral is stationary under small variations of the path $$\delta \int \mathcal{L}\, dt = 0 \tag{2}$$

A more direct method of approach in the case of orbital motion is to enumerate a complete set of six invariants, based on conservation laws. Since the force of gravity may be derived from a potential that depends only on position, it is a conservative force, so the total energy T+V, where T denotes the kinetic energy and V denotes the potential energy, is a constant of the motion. The total energy is proportional to the mass of the satellite, but this factor occurs in both the kinetic and potential energy terms, and so has no effect on the orbit of the satellite.

The first orbital invariant may be identified as specific energy, the ratio of total energy to the mass of the satellite:

$$E = \frac{1}{2}v^2 - \frac{GM}{r} = \frac{1}{2}v \cdot v - \frac{GM}{\sqrt{r \cdot r}} \tag{3}$$

where E denotes the specific energy; v is velocity; v is the velocity vector; r is the range vector; and $GM=3.98658366*10^{14}$ m³/s² denotes the product of the mass of the Earth and the universal gravity constant. Angular momentum is conserved for a central force like gravity, since no torque acts on the satellite. Angular momentum (L) is likewise proportional to the mass of the satellite, therefore the specific angular momentum vector provides three more invariants:

$$L = r \times v \tag{4}$$

In an embodiment, it may be useful to separate the magnitude of the angular momentum from the direction of the angular momentum, since the magnitude is associated with the shape of the elliptical orbit, whereas the direction determines the orientation of the orbital plane:

$$L = \|r \times v\| \tag{5}$$

$$l = \frac{r \times v}{L} \quad (6)$$

The geometrical shape of the orbit is fixed by the constants E and L. The semi-major axis (a) of the orbit is:

$$a = -\frac{GM}{2E} \quad (7)$$

The ellipticity (e) of the orbit is:

$$e = \sqrt{1 + \frac{2EL^2}{GM^2}} \quad (8)$$

A second vector invariant for Kepler motion is the Lenz vector. The existence of this vector is associated with the fact that the elliptical orbits for the Kepler case are closed. It is a vector in the direction of the perigee, which is inertially fixed and lies in the orbital plane. The Lenz vector (A), normalized to the mass, is $$A = v \times (r \times v) - \frac{GM}{r} r \quad (9)$$

The angular momentum vector and the Lenz vector serve to completely orient the elliptical orbit in inertial space.

In an embodiment, a set of three orthogonal unit vectors $x_0$, $y_0$, and $z_0$ corresponding to a frame of reference fixed in the orbit may be represented by:

$$\begin{aligned} y_O &= \frac{r \times v}{L} \\ z_O &= -A/\|A\| \\ x_O &= y_O \times z_O \end{aligned} \quad (10)$$

The orthogonal matrix [O E] that transforms vectors in the original earth-centered inertial frame (E or ECI) in which the vectors r and v are expressed into vectors in the new orbit-fixed frame O is given as:

$$[OE] = \begin{bmatrix} \uparrow & \uparrow & \uparrow \\ x_O & y_O & z_O \\ \downarrow & \downarrow & \downarrow \end{bmatrix} \quad (11)$$

where Equation (8) is meant to denote that the orthogonal 3×3 matrix [O E] that transforms a vector in the ECI frame E into the corresponding vector in the orbit-fixed O frame is formed by making the components of each of the three vectors into a column and putting them side-by-side to form the matrix.

The orientation of the orbit in the new orbit-fixed inertial frame O is depicted in FIG. 10. The relationship between the two frames constitutes a complete Euler rotation (rotation through three independent angles). Various conventions may be used to define three Euler angles given an orthogonal matrix. In an embodiment, it is possible to represent the matrix as the composition of a rotation about z through angle ψ, a rotation about x through angle θ and then a second rotation about z through angle φ, as follows:

$$[OE] = \begin{bmatrix} \cos\phi & \sin\phi & 0 \\ -\sin\phi & \cos\phi & 0 \\ 0 & 0 & 1 \end{bmatrix} \begin{bmatrix} 1 & 0 & 0 \\ 0 & \cos\theta & \sin\theta \\ 0 & -\sin\theta & \cos\theta \end{bmatrix} \begin{bmatrix} \cos\psi & \sin\psi & 0 \\ -\sin\psi & \cos\psi & 0 \\ 0 & 0 & 1 \end{bmatrix} \quad (12)$$

$$= \begin{bmatrix} \cos\psi\cos\phi - \sin\psi\cos\theta\sin\phi & \cos\psi\sin\phi + \sin\psi\cos\theta\cos\phi & \sin\psi\sin\theta \\ -\sin\psi\cos\phi - \cos\psi\cos\theta\sin\phi & -\sin\psi\sin\phi + \cos\psi\cos\theta\cos\phi & \cos\psi\sin\theta \\ \sin\theta\sin\phi & -\sin\theta\cos\phi & \cos\theta \end{bmatrix}$$

Then the three Euler angles may be calculated from the matrix elements as follows, wherein the function a tan 2 denotes the full 360° arctangent function with two arguments:

$$\theta_{OE} = \cos^{-1}([OE]_{3,3})$$

$$\phi_{OE} = a\tan 2(-[OE]_{3,1}, [OE]_{3,2})$$

$$\psi_{OE} = a\tan 2([OE]_{1,3}, [OE]_{2,3}) \quad (13)$$

The five invariants {E, L, $\phi_{OE}$, $\theta_{OE}$, $\psi_{OE}$} determine the shape and the orientation in space of the satellite orbit. The sixth invariant fixes the time of perigee, and may be computed from the position vector r and the unit vectors given in Equation (10) as follows, wherein e and a are the eccentricity and semi-major axis from Equations (7) and (8):

$$\theta = \operatorname{atan2}(r \cdot x_O, r \cdot z_O) \quad (14)$$

$$\psi = 2\operatorname{atan}\left(\sqrt{\frac{1+e}{1-e}} \tan\frac{\theta}{2}\right)$$

$$t_P = \sqrt{\frac{a^3}{GM}} (\psi - e\sin\psi)$$

Figure 9:
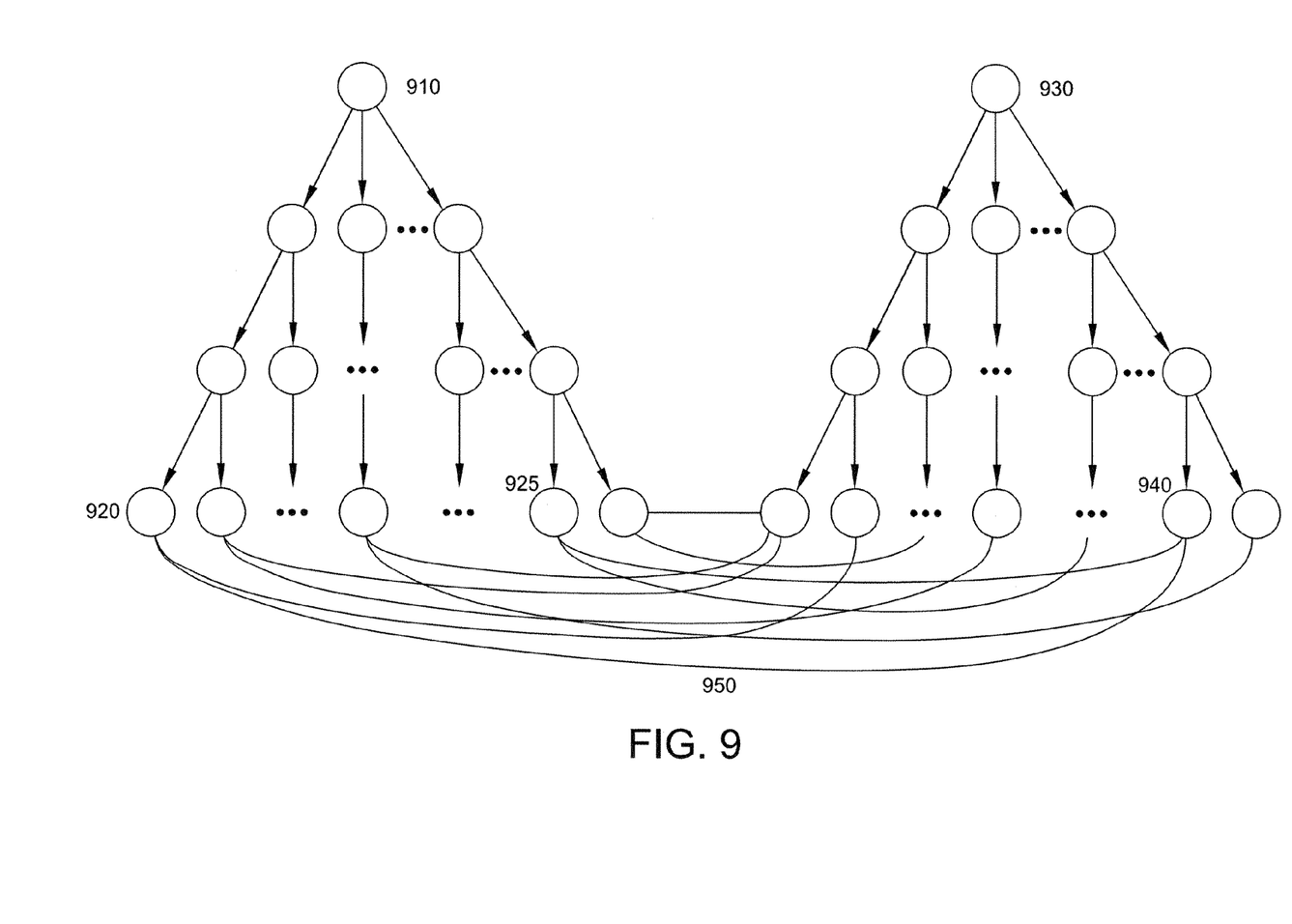
FIG. 9 depicts an exemplary reference graph and a query graph.

In an embodiment, the invariants may be used to connect the reference graph and the query graph during pre-processing as follows. Considering an embodiment using the connection of the terminal level of the reference graph to the query graph, one would analyze each leaf of the reference graph using its invariants. For the set of invariants peculiar to that leaf, the ballistic missile's orbit will be above the surface of the earth for some portion of the orbit, which is the portion of the orbit that is of interest. This portion of the orbit is broken up into multiple discrete events, either by uniform units of time, or uniform units of distance along the orbit, or by some other measure, so that in general a given reference graph leaf node will correspond to multiple query graph leaf nodes, since the ballistic object's orbit will satisfy multiple discrete query solutions over the course of its orbit. As shown in FIG. 9, a leaf node (e.g., node 940) of an exemplary query graph (930) may correspond to multiple leaf nodes (e.g., 920 and 925) of the reference graph (910), since in general it is possible for multiple independent ballistic trajectories to pass through a given point in space at a given time. For each reference graph leaf node's discrete event, the corresponding leaf node in the query graph is identified. A link, for example 950, is then made connecting the leaf nodes in the query graph for each discrete event to the reference graph leaf node being analyzed.

Figure 2:
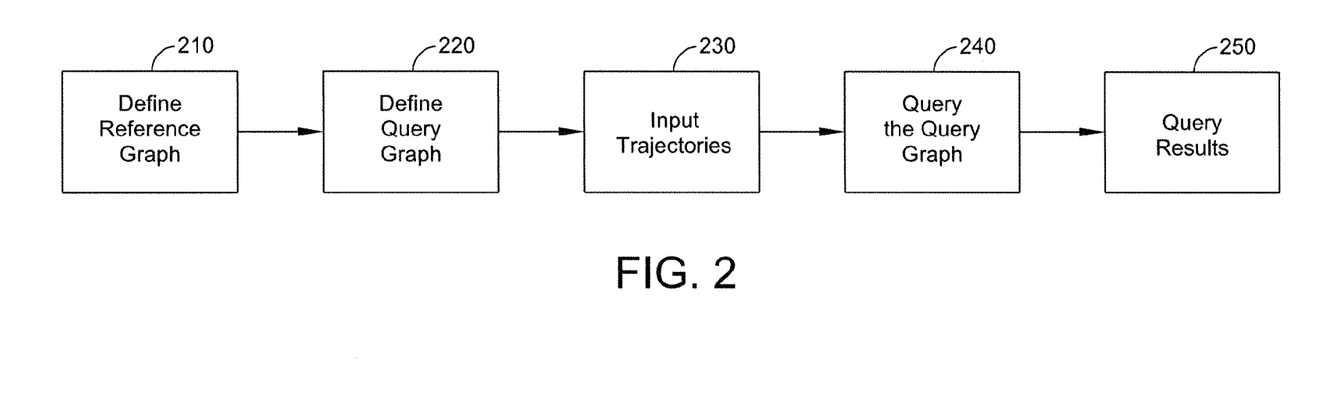
FIG. 2 depicts a simplified process flow of an embodiment for ballistic trajectory comparison.
Figure 3:
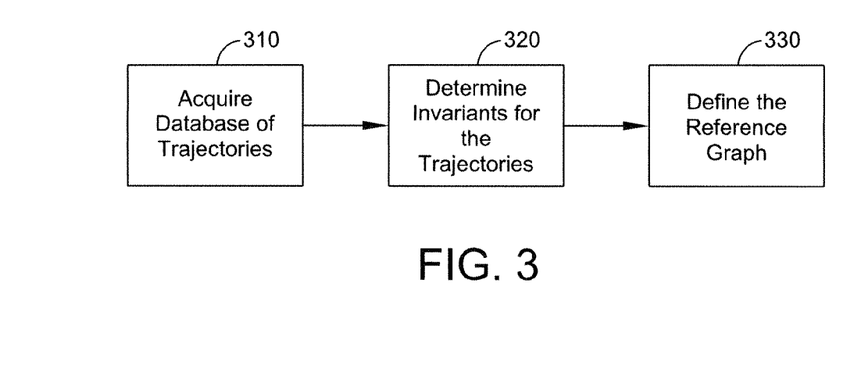
FIG. 3 depicts a simplified process flow illustrating an embodiment of a process for defining a reference graph to be used for ballistic trajectory analysis.
Figure 4:
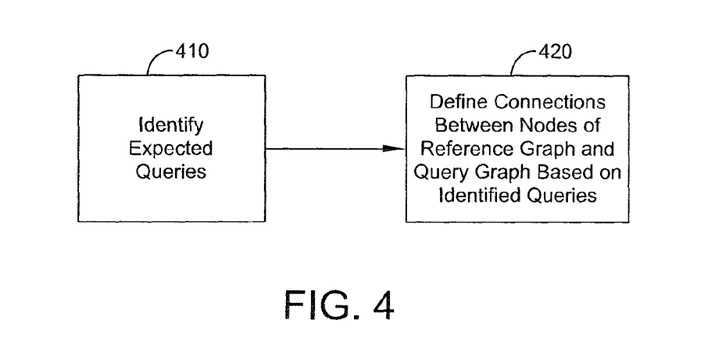
FIG. 4 depicts a simplified process flow illustrating an embodiment for defining a query graph to be used for ballistic trajectory analysis.

FIG. 2 depicts an embodiment of a process for ballistic trajectory analysis. In block 210, a reference graph is defined. As shown in FIG. 3, the reference graph may be defined by first acquiring a database of trajectory data for known objects 310, determining invariants for the trajectory data 320, and then mapping those invariants 330 into a tree structure that provides a decomposition of the invariant space as one descends levels in the tree. In an embodiment this may be performed using a preprocessor. The reference graph is a discrete representation of the invariant space, with the number of levels in the tree and the number of branches at each level being dependent on the granularity desired for a given application. At block 220, a query graph is defined. As noted, the query graph includes interconnections with the reference graph that provide the necessary paths to support the analyses to be performed on the trajectories. As shown in FIG. 4, a first step in defining a query graph may be to identify expected queries (block 410) that may be input into the query graph. Once those expected queries are identified, connections between the nodes of the reference graph are made at block 420, which is described in detail in relation to relation to block 120 of FIG. 1. The query graph may also be defined using a preprocessor. At block 230 of FIG. 2, invariants corresponding to observed trajectories are input into the reference graph, which, in an embodiment, may be performed by a runtime processor. At block 240, a query is input into the query graph using an interface, leading to query results 250 identified by the runtime processor that correspond to the query.

Figure 5:
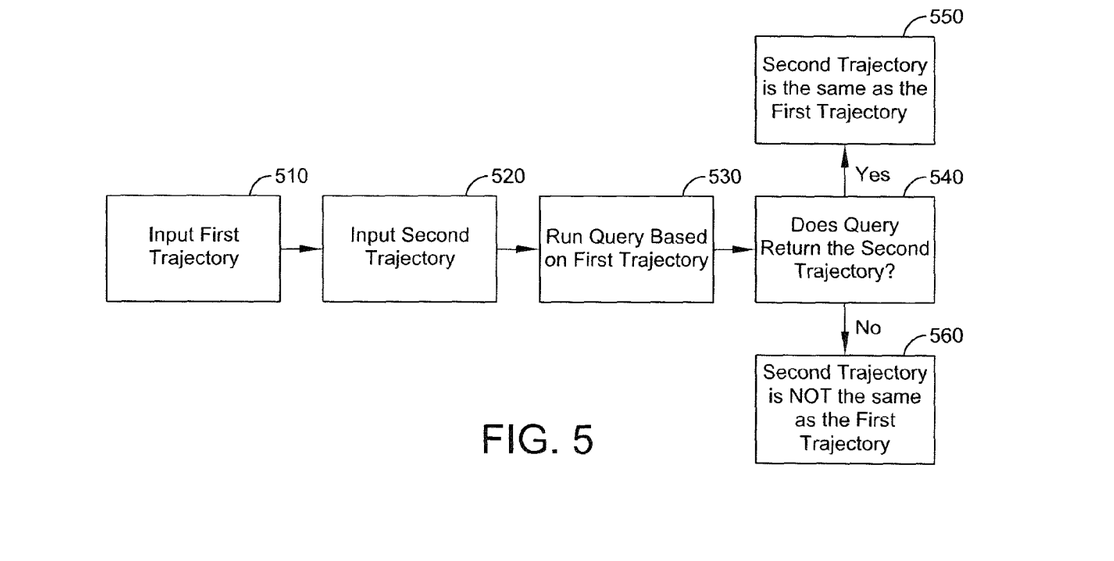
FIG. 5 depicts a simplified process flow or diagram illustrating an embodiment of runtime processing for ballistic trajectory analysis.

FIG. 5 depicts a simplified logic flow chart or diagram illustrating an overview of runtime processing (which may be performed by a runtime processor) for ballistic trajectory analysis in an embodiment in which the query graph is defined to compare observed trajectories against a particular or reference trajectory. At block 510, invariants corresponding to a first trajectory are input into the reference graph. The first trajectory is the trajectory for which a comparison is sought, and may represent the current trajectory being observed. At block 520, invariants for a second trajectory to be compared to the first trajectory are input into the reference graph. Although not shown in FIG. 5, invariants for additional trajectories that are to be compared to the first trajectory may also be input into the reference graph. The invariants for the second trajectory (and additional trajectories, if any) will traverse the reference graph, passing through nodes corresponding to the second trajectory. As noted, a data record of each node visited in the reference graph is kept for each trajectory. At block 530, a query is input into the query graph based on the invariants for the first trajectory. That is, the invariants corresponding to the first trajectory are used as search criteria for the query, which results in the query identifying nodes in the reference graph that correspond to the invariants of the first trajectory. At block 540, a determination is made as to whether the reference graph nodes identified by the query were visited by the invariants of the second trajectory when they were input into the reference graph. If a record of the second trajectory is present in, or for, the reference nodes identified by the query, then at block 550 a determination is made that the first and second trajectories were made by the same object. If the second trajectory is not identified in, or for, the nodes of the reference graph identified by the query, then at block 560 a determination is made that the first and second trajectories were made by different objects.

Figure 6:
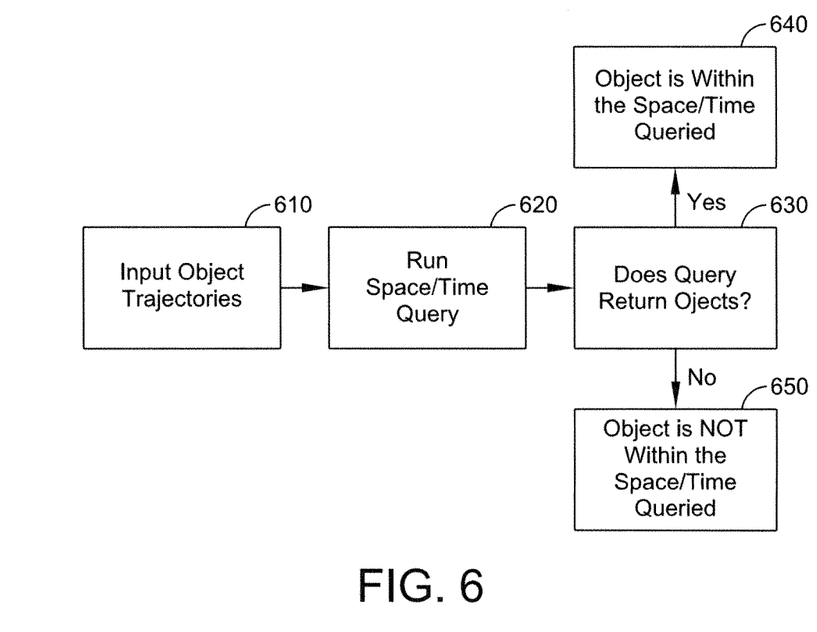
FIG. 6 depicts a simplified process flow illustrating an embodiment of runtime processing for ballistic trajectory analysis.

FIG. 6 depicts a simplified logic flow chart or diagram illustrating an overview of runtime processing for ballistic trajectory analysis an embodiment in which the system and method are defined to identify objects that meet specified criteria. This embodiment may be performed by a runtime processor. At block 610, invariants for the trajectories being observed are input into the reference graph. Each trajectory traverses the reference graph in accordance with its invariants, and a data record is left in each node that a trajectory invariant visits, whether by passing through the node or stopping at the node. At block 620, a query is input into the query graph based on criteria that a user wishes to search for. For example, a query may include criteria defining a volume of space that a user desires to search, or a query may include criteria defining a timespan that a user desires to search. In an embodiment, a query may include criteria for more than one type of search. For example, a query may include criteria defining a volume to be searched over a particular timespan. The invariants corresponding to the query criteria are input into the query graph and the query graph identifies the nodes in the reference graph that correspond to the invariants of the query. Then those nodes are checked at block 630 to see if the invariants for the trajectories input into the reference graph passed through those nodes. Objects whose trajectory invariants passed through the nodes identified by the query are considered to be within the query criteria at block 640. Objects whose trajectory invariants did not pass through the nodes identified by the query are considered to not be within the query criteria at block 650.

In an example, multiple trajectories are being observed during runtime processing and the invariants for those trajectories are identified one at a time. The invariant information is used to traverse the reference graph until the appropriate leaf nodes for each of these objects are reached, and at each of the appropriate leaves an identification for the vehicular object that satisfies the invariant criteria at that node is added to the list of identifiers. In this manner, the list of object identifiers is input into the reference graph at block 610. At block 620, a query is input into the query graph to identify which of the trajectories are within a particular volume of space within a particular timespan. The query identifies those nodes of the reference graph that correspond to the volume and timespan criteria of the query by way of the links between the leaf nodes of the query graph and the corresponding nodes in the reference graph. Those nodes are checked to determine which of the vehicular objects have trajectory invariants corresponding to those nodes by examining the list of vehicular object identifiers contained within that node. If the invariants for a trajectory correspond to nodes identified by the query, that trajectory is within the volume and timespan criteria of the query as shown at block 640. If the invariants for a trajectory are not within the nodes identified by the query, that trajectory is not within the volume and timespan criteria of the query as shown at block 650. Additionally, if the list of vehicular object identifiers at a selected reference graph is empty, then there are no objects with those invariants that satisfy the query criteria. Conversely, if the list is not empty, then any and all objects on the list are candidates that satisfy the query criteria.

Figure 7:
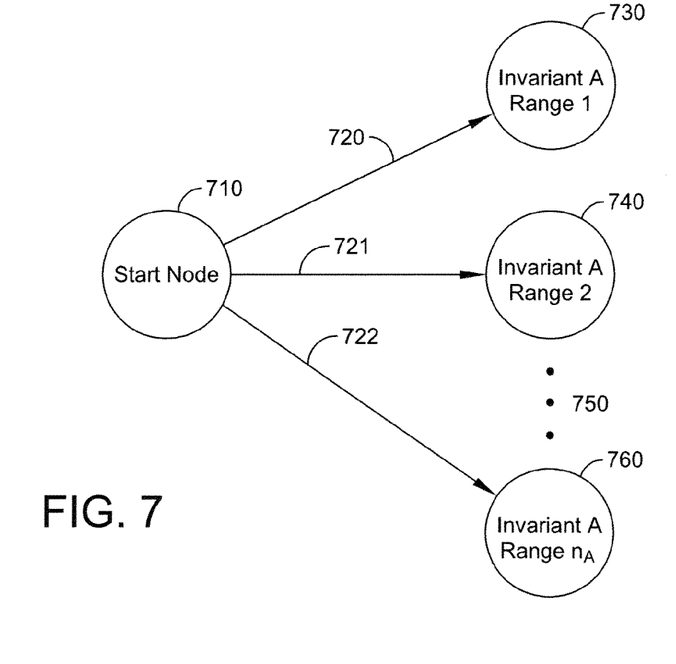
FIG. 7 depicts an exemplary initial or starting portion of a graph.

As is known to those skilled in the art, a graph consists of a collection of nodes (indicated in the FIGS. 7-9 as circles, such as 710), and interconnects (indicated in FIGS. 7-9 as line segments between nodes, such as 720). It is in the number of nodes and the information they represent, and the relationships between nodes as indicated by the interconnects, that allows the graph to support various analyses. The present invention uses graphs to arrange information about ballistic trajectories in a manner that supports rapid and efficient analyses of these trajectories. The graphs are arranged using a series of hierarchies or levels reflecting the decomposition of the ballistic trajectory invariants. FIG. 7 depicts an exemplary initial portion of a graph, in particular a reference graph.

In particular, FIG. 7 shows how proceeding from the Start Node 710, the interconnects (720, 721, and 722) branch the graph to $n_A$ different nodes, each of which is used to represent a discrete range of values for Invariant A. For example, node 730 represents Range 1 for Invariant A, node 740 represents Range 2, and so on (with the ellipsis to node 750 representing additional, unshown nodes representing other intermediate ranges for Invariant A), until finally node 760 for Range $n_A$ is connected to Start Node 710 by way of Interconnect 722. Invariant A could, for example, represent the expected range of eccentricities of the ballistic object's elliptical orbit, with this range of eccentricities being divided up into $n_A$ discrete ranges.

FIG. 8 shows an intermediate portion of a reference graph, starting with node 810 that represents Range k of Invariant G. As will be understood, the intermediate portion of the graph may be anywhere in the graph after the start node (e.g. 710 in FIG. 7). In the example of FIG. 8, for each of the $n_G$ nodes for Invariant G, there will be $n_H$ nodes for Invariant H attached to them, as indicated by 820, 830, 840, and 850. Like the initial portion of the graph, the intermediate portion of the graph uses interconnects (812, 813, and 814 in FIG. 8) to branch the graph to $n_H$ different nodes, each of which is used to represent a discrete range of values for Invariant H. Additional "intermediate" portions of the graph may be connected together to ensure consideration of the different Invariants. The reference graph will include the various ranges of trajectory invariants relevant to the application in which the invention is being used. For example, in the case of a system employed on a ship whose radar is being used to surveil a region close to the ship for ballistic targets, the invariants captured by the reference graph could represent only those ballistic trajectories likely to come within the range of the ship's radar.

After preprocessing to define the reference graph, preprocessing to define the query graph may be performed. As noted, query criteria that will be used to define the graph is identified, a graph is constructed using the query criteria, and then appropriate connections between the query graph and the reference graph may be created based on the query criteria. FIG. 9 shows an example of a reference graph starting at node 910, a query graph starting at node 930, and connections 950 between leaves of the two graphs. Although FIG. 9 only shows connections between the lowest levels of the graphs, as previously indicated, query graph connections may be made to other levels—i.e., the level or levels of the reference graph corresponding to the relevant criteria being queried. For example, if the query criteria are specific volumes in which objects will be identified at specific instances of time, for each given volume/time that might be queried an interconnection is made from the query graph to the nodes in the reference graph that correspond to the given volume. In an embodiment of the invention, such interconnections are made by examining all of the leaf nodes of the reference graph, and for each time value of interest for the set of invariants corresponding to that leaf, the corresponding leaf in the query graph is located, and a connection is made between the two leaves in question. As will be understood, a search area may be divided into any number of volumes of different shapes and sizes, and it would be extremely difficult to anticipate every possible volume a user may wish to search and create interconnections for all of the possible volumes. Therefore, in an embodiment a set of queries may be made available to a user so that the user may select from the volumes for which interconnections were made. Similarly, if the criteria uses a specific timespan during which objects will be identified, connections will be made from the query graph to the reference graph according to anticipated timespans that may be queried, and those anticipated timespans are presented to the user as query criteria. As noted, different criteria may be combined, such as volume and timespan, so that the query identifies objects within a particular volume during a particular time. In that embodiment, the anticipated combinations of volume and timespan may be identified, then interconnections may be made from the query graph to the nodes of the reference graph corresponding to the combinations of volume and timespan. During runtime, the user may be presented with search criteria selections that correspond to the volume and time combinations for which interconnections were made.

A system and method for analyzing ballistic trajectories may, in an example, be used to determine whether measurements reported by different sensors might represent the same object. Kinematic similarities, particularly similarities of trajectory invariants for objects with ballistic trajectories, provide a strong basis for either accepting or rejecting the proposition of whether two sets of observations represent different objects or not. In such an analysis, the reference graph could be populated with identifications of vehicular objects being reported by one of the sensors using the invariants calculated for the orbits of these ballistic objects. Then, as reports for objects from the second sensor are received, a query may be generated using the position of the object that is being reported, along with the time that the measurement was made. The measurement position and time information would be used to traverse the query graph until the corresponding leaf node in the query graph was located. This query graph leaf node would contain one or more connections to the reference graph. Each connection would be followed in turn to the corresponding leaf node in the reference graph, and at each node its list of vehicular objects observed by the first sensor would be examined.

As noted, each node of the reference graph corresponds to a unique combination of ballistic trajectory invariants. As also noted, a specific connection between the query graph and the reference graph corresponds to a query whose time value corresponds to a valid time in which the invariants are valid. Thus, any object identified on the list in, or for, a reference graph node located by a query graph search is an object that will be in the region specified by the query at the time specified by the query. Once all of the connections between the query graph leaf node and all of the indicated reference graph leaf nodes have been examined, then the query will have identified the complete list of candidate trajectory invariants that satisfy the query criteria, and eliminated all of the trajectory invariants that do not. By examining the candidate invariant nodes, the query will also have located any and all of the candidate vehicular objects that could satisfy the criteria. If the list is empty, then there are no objects corresponding to the measurements reported by the second sensor. If one or more objects are actively in these lists, they are candidates for further similarity analysis, such as a velocity comparison to see whether the two sets of reports are for objects moving in the same direction at the same speed (which, if this is the case, would be a strong indicator that the two reports are for the same object).

The real time processing of observed trajectory data involves traversing the reference graph that was developed in the pre-processing stage and then using the query graph to identify the observed trajectories that satisfy a particular query. In an embodiment, trajectory data for an observed object is received, invariants are calculated for the trajectory data, and the representation of an object based on its invariants is indicated in the reference graph. As noted, the reference graph is a mapping of expected invariants in a tree structure that provides a decomposition of the invariant space.

The invariants for the observed trajectory data are used to input representations of the vehicular objects into the reference graph and the tree structure causes a traversal through the nodes of the reference graph that correspond to the observed trajectory data invariants.

As noted, a user may select a query that will be used by the query graph to identify objects that satisfy the query. As indicated, in an embodiment a selection of queries may be presented to the user for the user to pick from, where the possible queries correspond to queries for which the query graph and reference graph have interconnections. After a user selects a query (using an interface with the runtime processor) from the presented queries, the runtime processor can identify the objects that satisfy the query by checking the relevant nodes of the reference graph for a data record of an instance of a vehicular object with a set of invariants that passed through the relevant nodes as the reference graph was traversed, based on the values of these invariants. If an object with such invariants has passed through the relevant nodes, the object that is associated with the invariants is identified. In this way, the query graph may be used to identify any objects that satisfy a query.

The disclosed method described herein may be automated by, for example, tangibly embodying a program of instructions upon a computer readable storage media capable of being read by machine capable of executing the instructions. A general purpose computer is one example of such a machine. A non-limiting exemplary list of appropriate storage media well known in the art would include such devices as a readable or writeable CD, flash memory chips (e.g., thumb drives), various magnetic storage media, and the like.

The features of the method have been disclosed, and further variations will be apparent to persons skilled in the art. All such variations are considered to be within the scope of the appended claims. Reference should be made to the appended claims, rather than the foregoing specification, as indicating the true scope of the disclosed method.

The functions and process steps herein may be performed automatically or wholly or partially in response to user command. An activity (including a step) performed automatically is performed in response to executable instruction or device operation without user direct initiation of the activity.

The pre-processing processes and steps may be performed by a system of computers, processors, memory, hardware, software, firmware, and the like, with networking or other communications connections between the different components of the system. The system for performing the pre-processing processes and steps may, in an embodiment, reside in a location that is remote from the sensors and associated equipment (e.g., computers, processors, memory, hardware, software, firmware) performing the real-time sensing of vehicle tracks. As will be understood, sensors may be based at a facility (such as a sensors at a ground-based facility or sensors on a satellite) or they may be based on a vehicle (such as on a submarine, plane, or ship). The sensor data from the variety of different sensors at different locations may be communicated via computer network (or other communications means) to the location where the graph is housed so that they may be input into the graph. In an embodiment the graph may be located on a computer system that is local to the primary vehicle or facility that is performing the real-time tracking. In another embodiment, the graph created in the pre-processing step may be remotely located from the primary vehicle or facility that is performing the real-time tracking. If the graph is remotely located, it may be accessible via computer network (or satellite communications or other known methods) by vehicles or facilities in need of the graph for real-time assessment.

Furthermore, although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method for analyzing ballistic trajectories comprising:
    determining, using a preprocessor, invariants for known ballistic object trajectories;
    defining, using the preprocessor, a reference graph having nodes and links corresponding to the invariants for the known ballistic object trajectories;
    defining, using the preprocessor, a query graph having nodes connected to the nodes of the reference graph corresponding to anticipated queries to be made using the query graph;
    inputting into the reference graph, using a runtime processor, a first set of invariants corresponding to a first observed object and traversing through the nodes of the reference graph based on the first set of invariants;
    inputting into the reference graph, using the runtime processor, one or more additional sets of invariants corresponding to one or more additional observed objects and, traversing through the nodes of the reference graph for each of the one or more additional observed objects based on the one or more additional sets of invariants;
    selecting, using an interface, a query for the query graph corresponding to the first set of invariants, said query generating a query result identifying the nodes of the reference graph that satisfy the query;
    determining, using the runtime processor, whether one or more invariants corresponding to one or more of the one or more additional sets of invariants corresponding to one or more of the one or more additional observed objects passed through the identified nodes; and
    determining, for each one of the one or more additional observed objects using the runtime processor, that the one of the one or more additional observed objects corresponding to one of the one or more additional sets of invariants is the same as the first observed object when the invariants of the one of the one or more additional observed objects caused traversal through the identified nodes.

2. The method of claim 1, wherein the invariants for the known ballistic object trajectories, the first set of invariants, and the one or more sets of additional invariants are determined from state vectors.

3. The method of claim 1, wherein the query corresponding to the first set of invariants comprises the first set of invariants and a padding range for each of the first set of invariants.

4. The method of claim 1, wherein traversing through the nodes of the reference graph based on the first set of invariants further comprises storing for each traversed node a record of the first observed object corresponding to the first set of invariants;
    wherein, traversing through the nodes of the reference graph for each of the one or more additional observed objects further comprises storing, for each one of the one or more additional observed objects, in the each traversed node a record of the one of the one or more additional observed objects whose invariants caused traversal of the traversed node; and wherein determining whether one or more invariants corresponding to one or more of the one or more additional sets of invariants corresponding to one or more of the one or more additional observed objects passed through the identified nodes comprises determining whether a record of the one of the one or more additional observed objects was stored in the identified nodes.

5. The method of claim 4, further comprising removing the record of the first observed object from the reference graph when observation of the first observed object is discontinued.

6. The method of claim 4, further comprising removing the record of each of the one or more observed additional objects from the reference graph when observation of each of the one or more observed additional objects is discontinued.

7. The method of claim 1, wherein selecting the query for the query graph further comprises making available queries for selection corresponding to connections between the nodes of the query graph and the nodes of the reference graph.

8. A method for analyzing ballistic trajectories comprising:
   determining, using a preprocessor, invariants for known ballistic objects;
   defining, using the preprocessor, a reference graph having nodes corresponding to the invariants for the known ballistic objects;
   defining, using the preprocessor, a query graph having nodes connected to nodes of the reference graph corresponding to anticipated invariant queries to be made using the query graph;
   inputting into the reference graph, using a runtime processor, one or more sets of invariants corresponding to trajectories of one or more observed objects, each of the one or more sets of invariants traversing through the nodes of the reference graph corresponding to the each of the one or more sets of invariants and leaving a record in the nodes traversed;
   selecting, using an interface, a query for the query graph corresponding to one or more range of invariants, said query generating a query result identifying the nodes of the reference graph that satisfy the query; and
   identifying, using the runtime processor, each of the one or more observed objects identified by a record in the identified nodes, thereby determining which of the one or more observed objects satisfy the query.

9. The method of claim 8, wherein the invariants for the known ballistic objects and each of the one or more sets of invariants are determined from state vectors.

10. The method of claim 8, wherein the one or more range of invariants are defined in the defining of the query graph and comprises the range of invariants defining a particular search volume, and wherein at least some of the anticipated invariant queries include the range of invariants defining the particular search volume.

11. The method of claim 8, wherein the one or more range of invariants are defined in the defining of the query graph and comprises a range defining a particular timespan, and wherein at least some of the anticipated invariant queries include a range of invariants defining the particular timespan.

12. The method of claim 8, wherein the one or more range of invariants are defined in the defining of the query graph and comprises a combination of a range defining a particular search volume and a range defining a particular timespan, and wherein at least some of the anticipated invariant queries include combinations of the particular search volume and the particular timespan.

13. The method of claim 8, wherein connections between nodes of the reference graph and nodes of the query graph comprise the connections between nodes of the query graph corresponding to anticipated invariant queries and nodes of the reference graph that correspond to anticipated invariant queries.

14. The method of claim 8, wherein selecting the query for the query graph further comprises making available queries for selection corresponding to connections between the nodes of the query graph and the nodes of the reference graph.

15. A system for analyzing ballistic trajectories comprising:
   a database storing trajectory data for known ballistic objects;
   a preprocessor executing program instructions which, when executed, cause the preprocessor to:
      determine invariants for each of the known ballistic objects based on the trajectory data in the database;
      define a reference graph having nodes corresponding to the invariants for each of the known ballistic objects; and
      define a query graph having nodes connected to the nodes of the reference graph corresponding to anticipated queries to be made using the query graph;
   at least one sensor for monitoring trajectories of one or more observed objects;
   a runtime processor executing program instructions which, when executed, cause the runtime processor to input into the reference graph one or more sets of invariants corresponding to the trajectories of the one or more observed objects monitored by the at least one sensor, each of the one or more sets of invariants traversing through the nodes of the reference graph corresponding to the each of the one or more sets of invariants and leaving a record in the nodes traversed; and
   an interface configured to allow selection of a query for the query graph corresponding to one or more range of invariants, said query generating a query result identifying the nodes of the reference graph that satisfy the query;
   wherein the runtime processor further executes program instructions which, when executed, cause the runtime processor to identify records left in the identified nodes, thereby determining an identity of the one or more observed objects that satisfy the query.

16. The system of claim 15, further comprising a display for displaying the identity of the one or more observed objects that satisfy the query.

17. The system of claim 15, wherein the anticipated queries used by the preprocessor to define the query graph include a range of invariants defining a particular search volume.

18. The system of claim 15, wherein the anticipated queries used by the preprocessor to define the query graph include a range of invariants defining a particular timespan.

19. The system of claim 15, wherein the anticipated queries used by the preprocessor to define the query graph include combinations of a range of invariants defining a particular search volume and a range of invariants defining a particular timespan.

20. The system of claim 15, wherein the anticipated queries used by the preprocessor to define the query graph include a range of invariants defining a known ballistic trajectory.

* * * * *